Nov. 8, 1955   R. P. BUTLER   2,723,084
ELECTRICAL CONTROL FOR STEAM VALVES AND THE LIKE
Filed Oct. 4, 1951
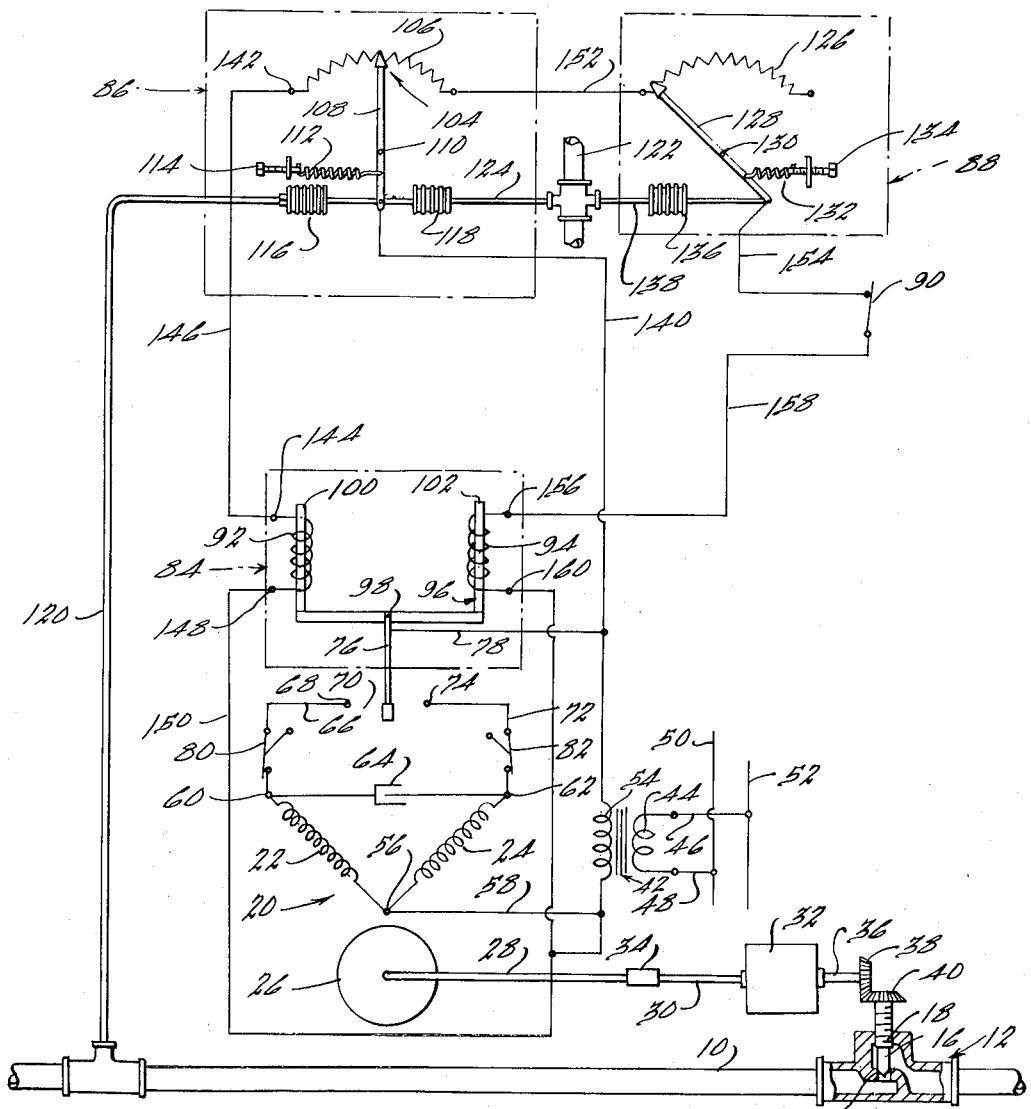
INVENTOR.
Robert P. Butler.
BY
Harness, Dickey & Pierce.
ATTORNEYS.

ically to
United States Patent Office
2,723,084
Patented Nov. 8, 1955

2,723,084
ELECTRICAL CONTROL FOR STEAM VALVES AND THE LIKE

Robert P. Butler, Birmingham, Mich., assignor of 28/88 to Joseph T. Reader, 22⅔/88 to Albert E. Fisher, and 16/88 to Harold E. Rose, jointly Application October 4, 1951, Serial No. 249,734

17 Claims. (Cl. 237—9)

This invention relates to new and useful improvements in controls for electrically actuated valves.

Steam heating systems conventionally include a steam supply line for conducting steam from a boiler or other suitable source to the heat exchangers or other apparatus in the system and also a return line for conducting condensate and air from the several pieces of apparatus back to the boiler or other suitable place of disposal. Flow of steam through the supply pipe conventionally is controlled by a valve, and this valve is operated by a thermostat or other suitable cycling device to permit the steam to flow into the system at spaced time intervals. The frequency and duration of the periods when the valve is opened to admit steam to the system depend upon the weather and other factors. In certain instances a vacuum pump is connected to the return line of the system to maintain a partial vacuum therein and thus assure sufficient pressure differential between the steam supply line and the return line to assure proper circulation of steam through the heat exchangers and other apparatus.

For reasons set forth in Patent No. 2,312,191, issued February 23, 1943, to Joseph T. Reader, it is desirable to maintain a predetermined pressure differential between the two sides of the system and to vary the pressure differential depending on the heat demands on the system. For example, in mild weather it is desirable to maintain a relatively small pressure differential across the system, whereas in cold weather it is desirable to maintain a relatively large pressure differential between the supply and return sides. Further, it is desirable that the pressure differential vary gradually in accordance with the outside temperature. The Reader patent supra discloses a system of this type and it also discloses a mechanically operated control for the steam valve which functions automatically to maintain the desired conditions in the system.

This invention constitutes an improvement in the valve-control means disclosed in the Reader patent referred to above. Specifically, this invention is an electrically operated control for actuating the steam control valve. In practice, it functions in response to a thermostat or other cycling device to selectively open and close the steam valve and to control the valve automatically in accordance with the heat demands on the system. In general, the electrically operated valve of this invention is simpler and more compact than the mechanically actuated valve disclosed in the Reader patent. It is lighter in weight, more compact in use, and less expensive to manufacture and install.

From the foregoing it will be readily apparent that an important object of the present invention is to provide a control for steam valves and the like that is relatively simple in construction and compact in use and which is relatively inexpensive to manufacture and install.

Another object of the invention is to provide an electrical control for steam valves and the like that is responsive to pressure conditions in the system to selectively position the valve and which functions automatically to maintain the proper differential in pressure between the supply and return sides of the system in accordance with the heat demands on the system, as well as to vary the differential in pressure according to the outdoor temperature.

Other objects and advantages of the invention will be apparent during the course of the following description.

In the drawing forming a part of this specification and wherein like numerals are employed to designate like parts throughout the same, the single figure is a diagrammatic view showing a control circuit embodying the invention and illustrating its relation to parts which control it and parts actuated thereby.

It is to be understood that the circuit shown by way of illustration in the drawing is representative only and it is apparent that modifications can be made in the specific instrumentalities used in the circuit to obtain the same end result. It is contemplated, therefore, that the scope of this invention be determined solely by the subjoined claims and not by the specific structure shown and described. The particular embodiment shown in the drawing merely illustrates the principles of the invention. A detailed description of this embodiment is now given.

Only so much of the conventional steam heating system is shown as is necessary to illustrate its relationship with the control instrument embodying the present invention. Specifically a steam supply line 10 is shown, and this line extends from a boiler (not shown) or other suitable source of steam under pressure to heat exchangers (not shown) or other pieces of equipment in the system according to conventional practice. A conventional valve 12 is provided in the steam line 10 for controlling flow of steam therethrough. The particular valve 12 here shown is a motorized valve having an orifice 14 through which all steam traversing the line 10 flows. Passage of steam through the orifice 14 is controlled by a valve stem 16 having a threaded connection 18 with the valve casing. An annular tapered seat is provided around the orifice 14 to receive a correspondingly tapered lower end on the valve stem 16. When the valve stem 16 is lowered against its seat it shuts off all flow through the valve body, and as the valve stem is progressively withdrawn or retracted from its seat it allows increasing amounts of steam to traverse the valve body. By reason of the threaded connection 18, the valve stem 16 can be selectively positioned with respect to the valve seat simply by rotating it in one direction or the other.

In the form of the invention shown, the valve 12 is actuated by a motor 20 having the usual windings 22 and 24 and a rotor 26. The rotor 26 drives a shaft 28 which is connected to the input shaft 30 of a gear-reduction unit 32 by a coupling 34, and the output shaft 36 of the gear-reduction unit is rotatably connected to the valve stem 16 by bevel gears 38 and 40. Thus, rotation of the rotor 26 rotatably drives the valve stem 16 at a reduced speed. As suggested, rotation of the rotor 26 in one direction moves the valve stem 16 toward its seat, and rotation of the rotor in the opposite direction moves the valve away from its seat. The thread comprising the connection 18 preferably has a relatively long lead so that the valve can be moved from fully closed position to fully open position by less than one revolution of the valve stem 16. Valves are readily available that can be moved from fully closed to fully open position by rotating the valve stem approximately 120°. This type of valve is suitable for use in the instant invention.

Power is supplied to the motor 20 from a suitable source such as a transformer 42. The primary winding 44 of the transformer 42 is electrically connected by conductors 46 and 48 to main line busses 50 and 52. The secondary winding 54 of the transformer 42 is connected to the motor 20 through a switch as hereinafter described. Specifically the two windings 22 and 24 of the motor 20 are connected to the common terminal 56 and the latter is electrically connected to the secondary winding 54 of the transformer 42 by a conductor 58. The other two motor terminals 60 and 62 are electrically interconnected by a capacitor 64 according to conventional practice, so that either one or the other of the windings 22 and 24 may be powered directly to cause the rotor 26 to rotate in either a clockwise or a counterclockwise direction. The motor contact 60 also is connected by a conductor 66 to the contact 68 of a control switch 70. The motor contact 62 is similarly connected by a conductor 72 to the other contact 74 of the switch 70. A pivoted switch arm 76 is mounted between the switch contacts 68 and 74 and is electrically connected to the transformer secondary winding 54 by a conductor 78.

In use, the switch arm 76 can be positioned intermediate the switch contacts 68 and 74 to interrupt flow of current through the motor 20. When the switch arm 76 is thus positioned, the motor 20 is de-energized and the valve 16 remains wherever it happened to be at the time the motor was de-energized. As suggested, however, the switch arm 76 is movable in one direction to engage the switch contact 68 and in the other direction to engage the switch contact 74. When the switch arm 76 is engaged with contact 68, the motor winding 22 is powered directly from the transformer 42 and the motor winding 24 is powered through the capacitor 64. Energization of the motor 20 in this manner causes the rotor 26 to rotate in a direction to close the valve stem 16. On the other hand, when the switch arm 76 engages the switch contact 74, the motor winding 24 is powered directly from the transformer 42 and the other motor winding 22 is powered through the capacitor 64. This causes the rotor 26 to rotate in the opposite direction and to open the valve stem 16.

Limit switches 80 and 82 are provided in conductors 66 and 72 respectively, and these limit switches are operated in any suitable manner as by the valve stem 16 at opposite limits of its rotational travel. Specifically, the limit switch 80 is opened by the valve stem 16 when the latter is fully closed, and limit switch 82 is opened when the valve stem is fully open. Thus, the limit switches 80 and 82 operate to prevent overtravel of the valve stem 16 and consequential damage to the valve parts. As shown in the drawing, both limit switches 80 and 82 are normally closed and they are opened only when the valve stem 16 is at one limit or the other of its rotation. Thus, if switch arm 76 is in engagement with switch contact 68 and the valve stem 16 is in open or partially open position, the rotor 26 will rotate in a direction to close the valve stem and will continue to rotate until the limit switch 80 opens. When this occurs, flow of current through the motor 20 is interrupted and the motor stops. Conversely, when the switch arm 76 is in engagement with the switch contact 74 and the valve stem 16 is in closed or partially open position, the rotor 26 rotates the valve stem to fully open position and until the limit switch 82 is opened. When this occurs, flow of current through the motor is interrupted and the motor is de-energized. From the foregoing it will be apparent that when the valve stem 16 is fully closed, it remains closed until the switch arm 76 is positioned to direct current through the valve opening motor winding 24; and when the valve stem is fully opened, it remains open until the switch 76 is positioned to direct current through the valve closing motor winding 22.

According to the present invention, the switch arm 76 is actuated by a balancing relay 84 and the latter is controlled by a differential pressure-control instrument 86 and a varying differential pressure control instrument 88, all under the control of an automatic cycling device such as a thermostatic switch 90.

The balancing relay 84 consists of two solenoid coils 92 and 94 positioned in spaced relation with parallel axes and a U-shaped armature 96 mounted on the same pivot 98 as the switch arm 76 and with the legs 100 and 102 thereof extending through respective solenoid coils.

When no current is flowing through either of the solenoid coils 92 and 94 or when substantially equal current is flowing through the solenoid coils, the armature 96 is positioned to dispose switch arm 76 in an intermediate position between contacts 68 and 74. The switch arm 76 is shown in this position in the drawing, and, when so positioned, no current flows through the motor 20. On the other hand, if one or the other of the solenoid coils 92 and 94 is energized to the exclusion of the other, the leg of the armature 96 in the energized coil is pulled upwardly, and in doing so it swings the switch arm 76 into engagement with one or the other of the switch contacts 68 and 74. Thus, if solenoid coil 92 is energized, the armature leg 100 is pulled upwardly and switch arm 76 is swung into engagement with the switch contact 68. Alternatively, if the solenoid coil 94 is energized, the armature leg 102 is pulled upwardly and switch arm 76 is swung into engagement with the contact 74.

The same operation occurs if a greater amount of current is caused to flow through one or the other of the solenoid coils 92 and 94. The relay 84 is in a balanced condition and the contact arm 76 floats between the two stationary contacts 68 and 74 when the same or substantially the same amount of current is flowing between both solenoid coils 92 and 94. However, if this condition is upset so that a greater amount of current flows through one of the solenoid coils 92 and 94, the armature 96 is unbalanced to swing the switch arm 76 into engagement with one of the other of the contacts 68 and 74. Thus, if a greater amount of current is caused to flow through solenoid coil 92, the switch 76 is swung into engagement with contact 68. On the other hand, if a greater amount of current is caused to flow through solenoid current 94 the switch 76 is swung into engagement with contact 74.

The differential pressure-control instrument 86 comprises a potentiometer 104 having an impedance element 106 and a movable contactor 108. The impedance element 106 is here shown in the form of a resistance coil, and the contactor 108 is shown in direct engagement with the resistance coil. The contactor 108 is pivoted at 110 and a spring 112 is attached to the contactor below the pivot to urge the contactor continually in the direction of the variable differential pressure control instrument 88. The spring 112 preferably is provided with an adjustable device 114 that can be actuated to vary the force exerted by the spring on the contactor.

A pair of pressure-sensitive devices, here shown in the form of bellows 116 and 118, are provided at opposite sides of the contactor 108, and these bellows are connected to the contactor below pivot 110. The bellows 116 is connected to the steam supply pipe 10 by a tubular conduit 120, and the bellows 118 is similarly connected to the vacuum return pipe 122 of the system by a tubular conduit 124.

As suggested, the control apparatus embodying the present invention is intended primarily for use on steam systems in which the return line is evacuated or maintained under partial vacuum in any suitable manner as by means of a vacuum pump attached to the line. The apparatus is here shown incorporated in a system of this type, although fragmentary portions only are shown of the steam supply pipe 10 and of the vacuum-return pipe 122.

It will be apparent from the above that the bellows 116 is in communication with and subject to pressure existing in the steam-supply line 10 and that the bellows 116 is in communication with and influenced by pressure conditions existent in the vacuum-return line 122. Both bellows are mechanically connected to the contactor 108 and counteracting forces developed by the two bellows operate to move the contactor along the resistance coil 106 against the action of spring 112.

The forces exerted by the bellows 116 and 118 on the contactor 108 of course vary, depending upon the relative pressure conditions existing in the steam-supply line 10 and in the vacuum-return line 122. If the pressure drop between the two sides of the system is relatively great, viz., if there is high pressure in the steam line 10 and high vacuum or low pressure in the return line 122, the bellows 116 is expanded and the bellows 118 is contracted to swing the contactor 108 to the left on the resistance coil 106 as the latter is shown in the drawing. On the other hand, if there is relatively low pressure in the steam line 10 and a relatively high pressure or low vacuum in the vacuum-return line 122, the bellows 116 will be relatively contracted and the bellows 118 will be relatively expanded so that the joint action of the two bellows on the contactor 108 will swing the contactor to the right on the resistance coil 106 as the latter is shown in the drawing. As pressure conditions in the steam supply line 10 and vacuum-return line 122 vary between these two extreme conditions, the contactor 108 is positioned on the resistance coil 106 in accordance with the relative forces exerted by the two bellows.

The variable differential pressure-control instrument 88 comprises an impedance element here shown in the form of a resistance coil 126 which is swept by a contactor 128. The latter is pivoted at 130, and a spring 132 is connected thereto below the pivot. The spring 132 tends to swing contactor 128 toward the differential pressure-control instrument 86 or to the left on resistance coil 126 as the latter is shown in the drawing. The spring 132 preferably is equipped with an adjustable device 134 so that the pressure exerted by the spring on the contactor 128 can be regulated.

In addition to the above, the variable differential pressure-control instrument 88 is equipped with a bellows 136 which is mechanically connected to the contactor 128 below the pivot 130 and to the vacuum-return pipe 122 by a tubular conduit 138. Thus, the bellows 136 is in communication with and is subject to pressure conditions existent in the vacuum-return line 122, and it operates in response to these pressure conditions to rock the contactor 128 about the pivot 130 and along the resistance coil 126 against the action of spring 132. If there is no vacuum in the return pipe 122 the bellows 136 is relatively expanded and spring 132 positions the contactor 128 at the extreme left of the resistance coil 126 as the latter is shown in the drawing. On the other hand, a relatively high vacuum in the return line 122 contracts the bellows 136 and causes the latter to move contactor 128 to the right on the resistance coil 126. Manifestly, the degree to which the contactor 128 is moved on the resistance coil 126 varies, depending upon the degree of vacuum in the return line 122.

Describing now the manner in which the balancing relay 84, differential pressure control instrument 86, and varying differential pressure-control instrument 88 are electrically connected in the circuit, it will be observed that the contactor 108 is connected to the upper terminal of the secondary transformer winding 54 by a conductor 140. The left-hand terminal 142 of the potentiometer resistance coil 106 is connected to the upper terminal 144 of the solenoid coil 92 by a conductor 146. The lower terminal 148 of the solenoid coil 92 is connected to the transformer secondary winding 54 by a conductor 150. The two resistance elements 106 and 126 are connected in series by a conductor 152. The contactor 128 of the variable differential pressure-control instrument 88 is connected to the thermostatic switch 90 by a conductor 154 and the switch in turn is connected to the upper terminal 156 of the solenoid coil 94 by a conductor 158. The lower terminal 160 of the solenoid coil 94 is connected to the transformer secondary winding 54 by a conductor 162.

From the foregoing it will be readily apparent that current is supplied from the transformer 42 to the contactor 108 through conductor 140 and that the current divides at the resistance coil 106 flowing back to the transformer through opposite legs of a divided circuit. In the left leg of the circuit, current flows through the portion of the resistance coil 106 at the left of the contactor 108, through conductor 146 to the solenoid coil 92, and thence back to the transformer through conductor 150. In the right leg of the circuit, current flows through the portion of resistance coil 106 at the right of contactor 108, through conductor 152, through as much of the resistance coil 126 as is inserted in the circuit by selective positioning of the contactor 128, along the contactor 128 and conductor 154 to the thermostatic switch 90, thence to the solenoid coil 94, through conductor 158 and then back to the transformer through conductor 162. Thus as the thermostatic switch 90 is closed, current flows through both solenoid coils 92 and 94, and the switch arm 76 will be positioned in engagement with one or the other of the stationary contactors 68 and 74, depending upon the relative intensities of the currents traversing the solenoid coils. Also, it will be apparent that the intensities of the currents flowing in the two legs of the circuit vary, depending upon the position of contactors 108 and 128. The position of these contactors 108 and 128 in turn is determined by the relative pressure conditions in the steam-supply and vacuum-return lines of the system.

By way of example, the operation of the control embodying the instant invention is described in connection with a steam heating system of the type disclosed in my copending application Serial No. 249,783 filed on the 4th day of October 1951. It is to be understood in this connection that the control has utility apart from the above system but since it is adapted primarily for use with steam heating systems of this type, it is believed that a description setting forth the mode of operation of the control in connection with this system will best illustrate the operating principles of the control.

The steam heating system shown in the copending application conveniently may have a valve in the steam-supply line similar to the valve 12 here shown and it includes a return line similar to the line 122 here shown which normally is maintained under vacuum by a vacuum pump connected to the line. As set forth in the application, the steam-supply valve 12 is operated periodically by a suitable cycling device such as the one here illustrated at 90. In other words, the thermostat 90 operates to open the valve 12 periodically in accordance with heat demands on the system. The vacuum pump is operated continuously during the time intervals when the steam supply valve is shut off and is not operated at all during the time intervals when the steam supply valve is open.

In the operation of a steam heating system, it is desirable to maintain a high pressure differential between the two sides of the system during cold weather and to maintain a relatively low pressure differential between the two sides of the system during mild weather. In cold weather a relatively high differential is necessary to assure proper and uniform heating. In mild weather, when less steam is required for heating, it is more efficient and economical to maintain a lower differential. Further, it is desirable to maintain a gradually decreasing pressure differential between the two sides of the system as the weather moderates from cold to mild.

It is a feature of this invention that the control apparatus hereinabove described automatically maintains a proper pressure differential across the system appropriate to the particular temperature conditions existing at the time. In cold weather the control automatically maintains a relatively high pressure differential; in mild weather it automatically maintains a relatively low pressure differential; and as the weather changes from one extreme to the other the control automatically varies the differential pressure conditions in accordance with the change in the weather.

In order to illustrate the above, the operation of the system under the two extreme temperature conditions will be described in detail, and it will be apparent from this description how the control functions to maintain a differential pressure condition commensurate with maximum efficiency and economy of operation for all temperatures.

The operation of the system in cold weather is first described. In a typical installation it might be desirable under these conditions to maintain approximately four pounds' pressure differential in the system. Thus if one pound pressure is maintained in the steam-supply line when the valve 12 is open it is desirable to have approximately six inches of mercury vacuum in the return lines.

When the thermostatic switch 90 opens, showing that the heat requirements of the system have been satisfied, there is a positive pressure on the supply side of the system and a vacuum in the return lines thereof. The amount of pressure in the supply side depends upon the length of time the valve 12 was open and the extent to which it was opened. The amount of vacuum in the return lines varies, depending upon a number of factors, including the length of time the vacuum pump has been shut off, the amount of induced vacuum created in the system and the leakage into the system. In any event, however, there will be at least the minimum vacuum (usually three inches of mercury vacuum) for which the pump is set. Under the cold weather conditions being particularly considered at the present time, a relatively low vacuum usually exists in the return line and a relatively high pressure exists in the supply line at the instant the thermostatic switch 90 opens.

If it is assumed that the weather is cold and that the valve 12 has been open long enough to completely fill all the radiators with steam, in all probability all of the radiator traps will be closed at the instant the thermostat 90 opens. There will be a relatively high pressure in the bellows 116 and a relatively low vacuum in the bellows 118 so that the contactor 108 may well be at about the middle of the resistor 106 or substantially in the position shown in the drawing. The bellows 136, being subjected to only low vacuum, will have moved the contactor 128 only slightly if at all away from the left-hand end of the resistor 126. As soon as thermostatic switch 90 opens, it open-circuits the right leg of the circuit, and current flowing through the left leg thereof immediately closes the valve 12 in the manner hereinabove described. Simultaneously, the vacuum pump is started in operation to exhaust the return line of the system.

Steam continues to condense in the supply side of the system after the valve 12 closes. Thus, within a short time after the valve 12 closes, sufficient condensate accumulates in one or more of the radiators to open the trap at the outlet end thereof; and as soon as this occurs, the pressures on the two sides of the system are equalized. As soon as pressures in the two sides of the system are equalized, the same pressure exists in the two bellows 116 and 118 so that the effect of each on the contactor 108 is neutralized by the other. Thus, the spring 112 immediately acts to swing the contactor 108 as far as it will go to the right on the resistor 106. It will be assumed for the purpose of this discussion that the contactor will move all the way to the right on the resistor 106. Thereafter, each trap in the system continues to open and close intermittently to dump condensate accumulating in the radiators, and the total effect is to maintain the two sides of the system more or less in constant communication with each other. Also, the effect of the vacuum pump is manifested throughout the entire system to draw the condensate out of the radiators as soon as the traps open and to keep steam in the system flowing outwardly toward the remote parts of the system as described in my copending application referred to above. Under these conditions the vacuum pump and vacuum induced in the system by condensation of steam act jointly to create a relatively high vacuum all through the system in a relatively short time; and as the vacuum in the return rises, the contactor 128 moves to the right on the resistor 126. It is significant in this respect, however, that the total resistance of the impedance element 126 is less than the total resistance of impedance element 106 so that contactor 128 can never introduce more resistance into the right-hand leg of the circuit than exists in the left-hand leg thereof when the contactor 108 is at the extreme right end of the impedance element 106. Thus, at this time in the operation of the system the contactors 108 and 128 are automatically positioned so that there is greater resistance in the left-hand leg of the circuit than in the right-hand leg thereof whereby current automatically is directed through the right-hand leg of the circuit to open the valve 12 immediately when the thermostatic switch 90 is again closed.

The high heat demand on the system during cold weather, however, permits the thermostatic switch 90 to remain open for only a relatively short time. Usually this time interval is sufficiently short so that the contactor 128, if it moves at all, moves only a short distance to the right on the resistance 126. Usually under these conditions, closing of the thermostatic switch 90 finds the contactor 108 at the extreme right of the resistance 106 and the contactor 128 only a short distance from the left-hand end of the resistance 126.

From the foregoing, it will be apparent that current flows immediately through the right-hand leg of the circuit when the thermostatic switch 90 closes and the effect is to open the valve 12. The valve 12 continues to open as long as current traverses the right-hand leg of the circuit and current will continue to traverse this leg of the circuit until the resistances of the control instruments 86 and 88 are balanced. Very little immediate effect is felt in the return lines of the system when the thermostatic switch 90 closes, even though the pump is shut off at this time. Thus, the contactor 128 remains substantially stationary on the resistance 126. An immediate effect is felt in the steam-supply side of the system, however, since the incoming steam raises the pressure therein and this pressure immediately acts through the bellows 116 to move contactor 108 to the left on the resistance 106. Thus, after a few minutes, the contactor 128 may begin to move to the left on the resistance 126 and contactor 108 moves to the left on resistance 106. By reason of the fact that the variable differential control instrument 88 has introduced very little resistance into the circuit under these conditions it will be necessary for contactor 108 to return substantially to the middle of resistance 106 before the circuit is balanced. Thus by the time sufficient pressure has been created in the steam-supply side to move contactor 108 sufficiently to balance the circuit, motor 26 may have had time to open the valve 12 the maximum amount. On the other hand, pressure may build up in the system sufficiently fast so that the contactor 108 is able to balance the circuit before the valve 12 is fully opened. In any event, however, the contactor 108 eventually balances the circuit and the relay 84 moves to a neutral position, leaving the valve 12 open. Steam continues to enter the system at a rate determined by the particular open position of the valve 12. It may be that just enough steam is admitted to the system under these conditions to satisfy the heat demands on it, and if this condition obtains, the parts of the control remain without change until the thermostat is satisfied and shuts off the valve 12. On the other hand, if steam is being admitted at a rate faster than it is being condensed in the system, pressure will build up in the steam-supply side sufficiently to move the contactor 108 to the left past the neutral point. When the contactor 108 moves to the left sufficiently so that there is less resistance in the left-hand leg of the circuit than in the right-hand leg thereof, current flows through solenoid 92 to actuate the balancing relay 84 so as to energize the valve closing winding 22 of the motor 20, and the valve is moved toward the closed position. As the valve begins to close, the pressure in the steam-supply side is lowered and the contactor 108 again moves to the right of the resistance 106. When the system is again balanced so that equal amounts of currents flow through two solenoids 92 and 94, the balancing relay 84 again moves to the neutral position, de-energizing motor 26 and leaving the valve 12 in its last adjusted position. Under the conditions set forth above, the valve 12 may have been only partially closed or it may have been entirely closed. If the valve 12 is only partially closed, steam will continue to flow into the system at the reduced pressure. Thus, the control operates automatically to maintain steam flowing into the system at substantially the pressure required to meet the heat demands on the system. Further, the control operates automatically to regulate admission of steam to the system in the above manner until the thermostatic switch 90 is again satisfied. When this occurs, the switch 90 opens, the valve 12 is shut off, and the vacuum pump again begins to operate in the manner hereinabove described. This completes the cycle of operation.

It is particularly significant that under the conditions hereinabove described, it was necessary, by reason of conditions inherent in the system, that the contactor 108 return substantially to the middle of resistance 106 in order to balance the circuit, and this condition necessarily requires that a relatively high pressure be maintained in the steam-supply side of the system. It will be remembered in this connection that a high pressure in the steam-supply side of the system is necessary for maximum efficiency during cold weather.

The operation of the control in mild weather is now described. As suggested, it is desirable to maintain a relatively low pressure differential cross the system under these conditions and the control automatically functions to maintain the required low pressure differential under these conditions.

When the thermostatic switch 90 opens to close the valve 12 and start the vacuum pump in operation, the contactor 128 begins to move to the right on resistance 126 and the contactor 108 is moved all the way to the right on resistance 106 in the same manner as when the system is operating under cold weather conditions hereinabove described. In mild weather, however, heat demands on the system are relatively low so that the thermostat 90 remains satisfied for a relatively long time. Since the vacuum pump operates continuously when the thermostat 90 is satisfied, it remains in operation for relatively long periods of time, and it, together with induced vacuum effect in the system, is capable of creating a relatively high vacuum in the system. This high vacuum acts through the bellows 136 to force contactor 128 a substantial distance to the right on resistance 126 against the action of spring 132. In extreme mild weather, a sufficiently high vacuum may be created in the system to move contactor 128 substantially all the way to the right on resistance 126.

Thus, when the thermostatic switch 90 closes in mild weather, contactor 128 may be substantially all the way to the right on resistance 126 and contactor 108 will be all the way to the right on resistance 106. It will be observed that even under these conditions the control instruments 86 and 88 are positioned to unbalance the circuit in favor of the valve-opening solenoid 94 so that the valve 12 begins to open immediately when the thermostatic switch 90 closes. As before, the contactor 108 begins to move to the left on resistance 106 immediately when the valve 12 opens due to the increase in pressure on the supply side acting on the contactor through bellows 116. However, under the conditions now obtaining, the contactor need move only a slight distance to the left of the resistance 106 in order to balance the circuit inasmuch as a relatively high resistance has been introduced into the circuit by the variable differential control instrument 88. Thus, the point at which the contactor 108 balances the two sides of the circuit will be relatively far to the right on resistance 106.

By reason of the above, the electrical control circuit balances before the valve 12 has opened very far. As a consequence, steam is admitted to the system under relatively low pressure and the differential between the two sides of the system never becomes very great. If the weather conditions are just right, the control instrument will crack the steam-control valve and keep steam flowing into the system in very slight amounts so that the steam supplied to the system approximately balances the condensation of steam in the system. On the other hand, the control may admit steam under low pressure for a period of time; and then when the pressure builds up sufficiently to move contactor 108 to the left on resistance 106 sufficiently so that more resistance is introduced to the right-hand leg of the circuit than exists in the left-hand leg thereof, current will flow through the solenoid 92 to energize the valve closing motor winding 22 and close the valve 12. Thus, the valve 12 may be cracked and maintained in this position by the control instrument or it may be opened a small amount for a predetermined period of time and then closed, depending upon the exigencies of the particular situation. In either event, however, a high pressure is never permitted to build up in the steam-supply side of the system and a relatively slight pressure differential is maintained at all times between the two sides of the system. As suggested, this condition is adequate under the circumstances and it is desirable for maximum efficiency in operation.

From the above, it is obvious that the control operates automatically to maintain a relatively great pressure differential in the system at all times during cold weather and to maintain a relatively slight pressure differential in the system in mild weather. It will also be apparent that the control operates automatically to maintain intermediate pressure differential conditions in the system as the weather moderates from cold to mild. In other words, the control operates automatically to maintain a gradually decreasing pressure differential in the system as the weather varies progressively from cold to mild. During extreme cold weather the thermostat 90 remains satisfied for relatively short periods of time, and relatively low vacuum is maintained in the return line. If the weather moderates, the thermostat remains satisfied for progressively longer periods of time and a progressively higher vacuum is maintained in the return line of the system. As a progressively higher vacuum is created in the return line the contactor 128 of the variable differential pressure-control instrument 88 moves gradually to the right on resistance 126; and as the contactor 128 moves to the right, the point at which the contactor 108 balances the two sides on the system gradually moves to the right on resistance 106. As the balancing point moves to the right on resistance 106, the differential between the two sides of the system gradually diminishes. Thus the control automatically compensates for variations in the outside temperature and automatically operates the system to assure maximum efficiency and economy.

It may thus be seen that I have achieved the objects of my invention. I have devised an electrical control instrument for steam heating systems that is small and compact in size and that is efficient in operation. The control is relatively inexpensive to manufacture and it may be easily and quickly installed. Of particular significance is the fact that the instrument can be readily adapted to heating systems that have been previously installed in order to convert the system for operation according to the principles set forth in my copending application referred to above. Since the control is electrically operated, all of its connections to the system except the piping to the bellows 116, 118 and 136 are electrical, and the electrical conductors necessary to effect proper connections can be readily extended as required.

Having thus described the invention, I claim:

1. A control for steam valves and the like comprising a source of electrical energy, a motor-operated valve, a circuit electrically connecting said motor to said source of electrical energy and including a switch, means for actuating said motor in either of two directions including a balancing relay positioned to operate said switch and operable by a pair of solenoid coils one for operating the valve to closed position and the other for operating the valve to open position, a cycling device, a differential pressure-control instrument, a variable differential pressure-control instrument, both of said control instruments having potentiometers and each potentiometer having an impedance element and a movable contactor electrically associated with said impedance element, the impedance elements of said potentiometers being connected in series, said differential control instrument also having a spring connected to its contactor urging the latter toward the other of said potentiometers and tending to unbalance said circuit to close said valve and counteracting pressure-sensitive elements connected to said contactor for actuating the same against the action of said spring, said variable differential pressure-control instrument also having a spring connected to and urging the contactor of its potentiometer toward the other of said potentiometers and tending to unbalance said circuit to close said valve, and a pressure-sensitive element connected to said contactor operative to move the same against the action of said spring, and a divided circuit connecting the contactor of said differential pressure-control instrument to said source of electrical energy, one leg of the circuit electrically connecting the impedance element of said differential pressure-control instrument and the valve-closing solenoid coil in series with said source of electrical energy, the other leg of the circuit electrically connecting the two impedance elements, the cycling device and the valve-opening solenoid coil in series with said source of electrical energy.

2. A steam heating system of the type having a steam main, a vacuum return line, a valve controlling said main, means for selectively opening and closing said valve operable by a pair of separately energizable solenoids, one solenoid being operable to selectively open the valve and the other solenoid being operable to selectively close the valve, a differential pressure-control instrument, a varying differential pressure-control instrument, both of said control instruments having potentiometers and each potentiometer having an impedance element and a movable contactor electrically associated with said impedance element, the impedance elements of said potentiometers being electrically connected in series, said differential pressure-control instrument having a spring connected to its contactor urging the latter toward the other of said potentiometers and tending to unbalance said circuit to close said valve, and counteracting pressure-sensitive elements connected to and communicating with the main and return lines respectively and operable by the pressure differential to position the contactor of said differential pressure control instrument with respect to the impedance element of said differential pressure-control instrument against the action of said spring, said variable differential pressure-control instrument also having a spring connected to and urging the contactor of its potentiometer toward the other of said potentiometers and tending to unbalance said circuit to close said valve, and a pressure-sensitive element fastened to the contactor of said variable differential pressure-control instrument connected to and communicating with said return line and operative by variations in absolute pressure in the return line to position the contactor of said variable differential pressure-control instrument relative to the impedance element of said variable differential pressure-control instrument against the action of said spring, a source of electrical energy, and a divided circuit connecting the contactor of said differential pressure-control instrument to said source of electrical energy, one leg of the circuit electrically connecting the impedance element of said differential pressure-control instrument and the valve-closing solenoid in series with the source of electrical energy, the other leg of the circuit electrically connecting the two impedance elements, the contactor of the variable differential pressure-control instruments and the valve-opening solenoid in series with the source of electrical energy.

3. A valve-actuating mechanism for steam heating systems and the like comprising electrically operated means for selectively opening and closing a valve including separately energizable valve-opening and valve-closing solenoids, a differential pressure-control instrument including an impedance element and a movable contactor electrically associated with said impedance element, a variable differential pressure-control instrument having an impedance element and a contactor electrically associated with said impedance element, means electrically connecting the two impedance elements of the control instruments in series, a power source, means electrically connecting the valve-closing solenoid directly to said power source and to the impedance element of said differential pressure-control instrument at a point remote from the impedance element in said varying differential pressure-control instrument, means electrically connecting the contactor of said differential pressure control instrument to said power source, means electrically connecting the valve-opening solenoid to the power source and to the contactor of said varying differential pressure-control instrument, resilient means normally urging said contactors toward each other to normally energize said valve-closing solenoid, and pressure-sensitive means connected to the contactors operable to move the latter independently of said resilient means in response to variations in pressure to which they are subjected.

4. A valve-actuating mechanism for steam heating systems and the like comprising electrically operated means for selectively opening and closing a valve including separately energizable valve-opening and valve-closing solenoids, a differential pressure-control instrument including an impedance element and a movable contactor electrically associated with said impedance element, a variable differential pressure-control instrument having an impedance element and a contactor electrically associated with said impedance element, means electrically connecting the two impedance elements of the control instruments in series, a power source, means electrically connecting one terminal of the valve-closing solenoid directly to said power source, means electrically connecting the other terminal of said valve-closing solenoid to the impedance element of said differential pressure-control instrument at a point remote from the impedance element in said varying differential pressure-control instrument, means electrically connecting the contactor of said differential pressure control instrument to said power source, means electrically connecting one terminal of the valve-opening solenoid to the power source, and means electrically connecting the other terminal of the valve-opening solenoid to the contactor of said varying differential pressure-control instrument, resilient means normally urging said contactors toward each other to energize said valve-closing solenoid, pressure-sensitive means connected to the contactors operable to move the latter against the action of said resilient means in response to variations in pressure to which they are subjected, and a thermostatic switch electrically connected in series with said valve-opening solenoid operative periodically to open the circuit which includes said valve-opening solenoid and to assure energization of said valve-closing solenoid.

5. In an electrical control system, switch means, a pair of electrical actuators for controlling said switch means and operative to actuate the same as a consequence of the differential in electromagnetic effect produced by said actuators, a first circuit including one of said actuators for connection across a source of electrical potential, a second circuit including the other of said actuators for connection across said source of electrical potential, means including an impedance element and a contactor therefor in at least one of said circuits for proportioning the relative effects produced by said actuators, additional means including an impedance element and a contactor therefor for controlling the electromagnetic effect produced by one of said actuators independently of the electromagnetic effect produced by the other of said actuators, pressure-sensitive means connected to the contactor of said proportioning means and responsive to the differential between a relatively high pressure and a relatively low pressure to selectively position said contactor on the impedance element with which it is associated in accordance with the amount of said differential, pressure-sensitive means connected to the contactor of said additional means and responsive to said relatively low pressure to selectively position said contactor on the impedance element with which it is associated in accordance with the value of said relatively low pressure, and resilient means co-operable with said contactors and acting independently of said pressure-sensitive means tending to position said contactors on said impedance elements so as to selectively energize the actuator in one of said circuits.

6. In an electrical control system, switch means, a pair of electrical actuators for controlling said switch means and operative to actuate the same as a consequence of the differential in electromagnetic effect produced by said actuators, a first circuit including one of said actuators for connection across a source of electrical potential, a second circuit including the other of said actuators for connection across said source of electrical potential, means including an impedance element and a contactor therefor in at least one of said circuits for proportioning the relative effects produced by said actuators, additional means including an impedance element and a contactor therefor for controlling the electromagnetic effect produced by one of said actuators independently of the electromagnetic effect produced by the other of said actuators, pressure-sensitive means connected to the contactor of said proportioning means and responsive to the differential between a relatively high pressure and a relatively low pressure to selectively position said contactor on the impedance element with which it is associated in accordance with the amount of said differential, pressure-sensitive means connected to the contactor of said additional means and responsive to said relatively low pressure to selectively position said contactor on the impedance element with which it is associated in accordance with the value of said relatively low pressure, resilient means co-operable with said contactors and acting independently of said pressure-sensitive means tending to position said contactors on said impedance elements so as to selectively energize the actuator in said second circuit, and a thermostatic switch in said second circuit operable in response to temperature conditions in the vicinity of the switch and adapted to open periodically in response to said temperature conditions to selectively energize the actuator in said first circuit independently of the position of said contactors on said impedance elements.

7. In a steam heating system, a relatively high-pressure steam-supply line, a relatively low pressure vacuum-return line, a valve controlling said steam-supply line, electrically operated means for selectively opening and closing said valve, switch means controlling said valve-operating means, a pair of electrical actuators controlling said switch means and operable to actuate the same as a consequence of the differential in electromagnetic effect produced by said actuators, a first circuit including one of said actuators for connection across a source of electrical potential, a second circuit including the other of said actuators for connection across said source of electrical potential, means including an impedance element and a contactor therefor in at least one of said circuits for proportioning the relative effects produced by said actuators, additional means including an impedance element and a contactor therefor for controlling the electromagnetic effect produced by one of said actuators independently of the electromagnetic effect produced by the other of said actuators, pressure-sensitive means coactive with the contactor of said proportioning means and communicating with said steam-supply line and said vacuum-return line responsive to the differential in pressure between said lines to selectively position said contactor on the impedance element with which it is associated in accordance with said differential, pressure-sensitive means coactive with the contactor of said additional means and communicating with said vacuum-return line responsive to variations of pressure in said line to selectively position said contactor on the impedance element with which it is associated, yieldable means co-operable with said contactors and acting independently of said pressure-sensitive means tending to position said contactors on said impedance elements so as normally to energize the actuator in said second circuit, and a thermostatic switch in said second circuit operable in response to temperature conditions around the switch and adapted to open periodically in response to said temperature conditions to selectively energize the actuator in said first circuit independently of the position of said contactors on said impedance elements.

8. In a steam heating system of the type having a steam supply pipe and a valve controlling flow of steam through said pipe, a reversible motor mechanically connected to said valve to selectively open and close the same; and an electric circuit for operating said motor including a power source, a balancing relay having a pair of coils, a potentiometer having a resistance element and a contact movable along said resistance element, and a variable resistance element having a sliding contactor therefor, said power source being electrically connected directly to both of said relay coils and to the contactor of said potentiometer, the resistance element of said potentiometer being electrically connected directly to one of said relay coils and the contactor of said variable resistance being electrically connected to the other of said relay coils and both of said resistance elements being directly connected together in series relation, and a thermostatic switch connected in series between the contactor of said variable resistance and said other relay coil.

9. A steam heating system having a steam-supply pipe controlled by a motor-operated valve, a vacuum-return pipe, a power source, and an electrical control circuit having means for selectively controlling movement of said motor-operated valve, said means including a balanced relay means having a pair of magnetic coils operative in response to the relative current flow therethrough to control positioning of said relay, corresponding ends of said coils being directly electrically connected together and to one side of said power source, a first impedance element and a second impedance element electrically connected in series and to the other end of one of said coils, a variable tap means adjustably connected to said first impedance element and to said power source, a variable tap means adjustably connected to said second impedance element and to the other end of the other of said coils, pressure-actuated means connected to the tap means associated with said first impedance element communicating with said steam-supply pipe and said vacuum-return pipe operative in response to the differential in pressure between said pipes to position said tap means selectively on said impedance element, and a pressure-operated means connected to the tap means associated with said second impedance element communicating with said vacuum-return pipe operative by the absolute pressure in said pipe to position said tap means selectively on said second impedance element, whereby movement of said tap means is operative to vary the relative current flow through said coils to control positioning of said relay and consequently the movement of said motor-operated valve.

10. A steam heating system having a steam-supply pipe controlled by a motor-operated valve, a vacuum-return pipe, a power source, and an electrical control circuit having means for selectively controlling movement of said motor-operated valve, said means including a balanced relay means having a pair of magnetic coils operative in response to the relative current flow therethrough to control positioning of said relay, corresponding ends of said coils being directly electrically connected together and to one side of said power source, a first impedance element and a second impedance element electrically connected in series and to the other end of one of said coils, a variable tap means adjustably connected to said first impedance element and to said power source, a variable tap means adjustably connected to said second impedance element and to the other end of the other of said coils, a thermostatic switch electrically connected in series with said last-mentioned tap means operable to selectively energize one of said coils, pressure-actuated means connected to the tap means associated with said first impedance element communicating with said steam-supply pipe and said vacuum-return pipe operative in response to the differential in pressure between said pipes to position said tap means selectively on said impedance element, and a pressure-operated means connected to the tap means associated with said second impedance element communicating with said vacuum-return pipe operative by the absolute pressure in said pipe to position said tap means selectively on said second impedance element, whereby movement of said tap means is operative to vary the relative current flow through said coils to control positioning of said relay and consequently the movement of said motor-operated valve.

11. An electrical control circuit for steam heating systems of the type having a steam-supply pipe controlled by a motor-operated valve and a vacuum-return pipe, said circuit adapted to control movement of said motor-operated valve selectively and including a balanced relay means having a pair of magnetic coils operative in response to the relative current flow therethrough to control positioning of said relay, corresponding ends of said coils being directly connected together and adapted for connection to one side of a power-supply line, a pair of pressure-operated electrical control means each having an impedance element and a variable tap means adjustably connected to said impedance element, the impedance elements of both electrical control means being electrically connected in series, the impedance element of one electrical control means being connected to the other end of one of said coils and the tap means thereof adapted to be electrically connected to the other side of said power-supply line, the tap means of the other of said electrical control means being electrically connected to the other end of the other of said coils, pressure-operated means connected to the tap means of said one electrical control means and adapted for connection to the steam-supply pipe and the vacuum-return pipe and operable to position said tap means selectively on said impedance element in accordance with the differential in pressure between said pipes, and a pressure-operated means connected to the tap means of said other electrical control means adapted for connection to the vacuum-return pipe and operative in response to the absolute pressure in said line to position said tap means selectively on the impedance element with which it is associated.

12. An electrical control circuit for a steam heating system of the type having a steam-supply line controlled by a motor-operated valve and a vacuum-return line comprising means for selectively controlling the movement of said motor-operated valve including a balanced relay means having a pair of magnetic coils operative in response to the relative current flow therethrough to control positioning of said relay, conductor means connecting corresponding ends of said coils directly together adapted for connection to one side of a power-supply line comprising a voltage source so that substantially the entire voltage of such source appears across the combination of said control means and said coils, and electrical control means connected to the other ends of said coils and adapted to be connected to the other side of said power-supply line, said control means also adapted for connection to said steam-supply line and said vacuum-return line and operative in response to differential in pressure between said lines to vary the relative current flow through said coils to control positioning of said relay and consequently movement of said motor-operated valve.

13. In an electrical control system, means for selectively controlling the movement of an electric motor including a balanced relay means having a pair of magnetic coils operative in response to the relative current flow therethrough to control positioning of said relay, corresponding ends of said coils being directly connected together and adapted for connection to one side of a power-supply line, a first impedance means, and a second impedance means electrically connected in series and to the other end of one of said coils, a variable tap means adjustably connected to said first impedance means and adapted for connection to the other side of said power-supply line, and a variable tap means adjustably connected to said second impedance means and to the other end of the other of said coils, whereby movement of said tap means is operative to vary the current flow through said coils to control positioning of said relay means and consequently the movement of said motor.

14. The combination as set forth in claim 13 wherein said first and second impedance means are operative to introduce variable resistances to flow of electrical energy from said power-supply line through said coils and wherein the effective resistance of said second impedance means is less than the effective resistance of said first impedance means.

15. In an electrical control system, means for selectively controlling an electrically operable steam-control means, said selective control means including a balanced relay means having a pair of magnetic coils operative in response to the relative current flow therethrough to control positioning of said relay, corresponding ends of said coils being directly connected together and adapted for connection to a power source, a first impedance element and a second impedance element electrically connected in series and to the other end of one of said coils, a variable tap means adjustably connected to said first impedance element and adapted for connection to said power source, and a variable tap means adjustably connected to said second impedance element and to the other end of the other of said coils, whereby movement of said tap means is operative to vary the current flow through said coils to control positioning of said relay and consequently movement of said steam-control means.

16. In an electrical control system, means for selectively controlling movement of an electrically operated valve, said means including a balanced relay means having a pair of magnetic coils operative in response to the relative current flow therethrough to control positioning of said relay, corresponding ends of said coils being directly connected together and adapted for connection to one side of a power-supply line, and a pair of pressure-actuated means each having an impedance element and a variable tap means adjustably connected to said impedance element, said impedance elements being electrically connected in series, the impedance element of one pressure-actuated means being electrically connected to the other end of one coil, and the tap means of said one pressure-actuated means being electrically connected to the other side of said power-supply line, the tap means of the other pressure-actuated means being electrically connected to the other end of the other of said coils.

17. An electrical control system for heating systems comprising a voltage source, means for selectively controlling an electric motor, said means including a balanced relay means having a pair of magnetic coils operative in response to the relative current flow therethrough to control positioning of said relay, conductor means connected to said voltage source electrically connecting corresponding ends of said coils directly together, and pressure-actuated electrical control means connected to the other ends of said coils and adapted for connection to said voltage source operative to vary the relative current flow through said coils to control positioning of said relay and consequently the movement of said motor, substantially the entire voltage of said source appearing across the combination of said control means and said coils.

References Cited in the file of this patent
UNITED STATES PATENTS

| | | |
|---|---|---|
| 2,172,487 | Wasserlein | Sept. 12, 1939 |
| 2,185,500 | Crosthwait | Jan. 2, 1940 |
| 2,340,004 | McGrath | Jan. 25, 1944 |
| 2,454,263 | Newton | Nov. 16, 1948 |